United States Patent [19]

Partridge et al.

[11] Patent Number: 5,364,524
[45] Date of Patent: Nov. 15, 1994

[54] PROCESS FOR TREATING HEAVY OIL

[75] Inventors: Randall D. Partridge, W. Trenton; Lillian A. Rankel, Princeton, both of N.J.

[73] Assignee: Mobil Oil Corporation, Fairfax, Va.

[21] Appl. No.: 903,391

[22] Filed: Jun. 24, 1992

Related U.S. Application Data

[63] Continuation-in-part of Ser. No. 728,663, Jul. 11, 1991, abandoned, and a continuation-in-part of Ser. No. 747,829, Aug. 21, 1991, abandoned.

[51] Int. Cl.$^5$ .................. C10G 45/00; C10G 45/04
[52] U.S. Cl. .................. 208/251 H; 208/216 R; 208/217; 208/226; 208/230; 208/247
[58] Field of Search .............. 208/251 H, 216 R, 217, 208/226, 230, 247

[56] References Cited

U.S. PATENT DOCUMENTS

| | | | |
|---|---|---|---|
| 3,501,396 | 3/1970 | Gatsis | 208/216 R |
| 3,715,303 | 2/1973 | Wennerberg et al. | 208/112 |
| 3,812,028 | 5/1974 | Wennerberg et al. | 208/112 |
| 3,997,473 | 12/1976 | Schmitt, Jr. et al. | 208/216 R |
| 4,087,348 | 5/1978 | Baird, Jr. et al. | 208/226 |
| 4,127,470 | 11/1978 | Baird, Jr. et al. | 208/226 |
| 4,518,488 | 5/1985 | Wennerberg | 208/216 |

OTHER PUBLICATIONS

F. Delanny, et al., Appl. Catalysis, 10, 111 (1984).
Pereira, et al., J. Cat., 123, 463 (1990).
Klaus J. Huttinger, et al., Fuel, vol. 64, p. 491 (1985) no month available.

*Primary Examiner*—Paul Lieberman
*Assistant Examiner*—P. L. Hailey
*Attorney, Agent, or Firm*—Alexander J. McKillop; Dennis P. Santini; Laurence P. Hobbes

[57] ABSTRACT

A process for treating heavy oil by contacting the oil with hydrogen in a reactor containing an activated carbon catalyst having a specified range of Alpha value, and average pore diameter, and pore distribution, to reduce the content of nickel and vanadium in the feedstock and to achieve conversion of the carbon residue for producing a lighter oil. Demetallation capacity of the carbon catalyst is enhanced by the addition of a carbon-reactive oxidant, e.g., steam, under conditions sufficient to form additional carbon surface.

21 Claims, 8 Drawing Sheets

– 5,364,524 –

PROCESS FOR TREATING HEAVY OIL

RELATED APPLICATIONS

This case is a continuation in part of U.S. application Ser. No. 07/728,663, filed Jul. 11, 1991 and U.S. application Ser. No. 07/747,829, filed Aug. 21, 1991, both now abandoned, the contents of each being incorporated herein by reference in their entirety.

BACKGROUND OF THE INVENTION

1. Field of the Invention

This invention relates to a process for converting and upgrading heavy oils to produce a product suitable for transport through a pipeline and for further processing.

2. Background of the Art

As high quality crude oils are depleted, an inexpensive substitute for use as petroleum refinery feedstock becomes more desirable. One such substitute is petroleum residue, or heavy oil, such as that produced from the straight run distillation of crude oil. Another substitute for high quality crude oils are heavier crude oils.

The world's supply of light, sweet crudes has greatly diminished in recent years. Refiners have been forced to deal with ever heavier crudes, containing significantly more metals, while still producing a full spectrum of products. Much of the problem of upgrading these heavier stocks is due to the presence of so much metal, usually nickel and vanadium. The presence of large amounts of metal, usually in association with asphaltenes, presents a formidable upgrading challenge. Some of the worst of these materials are "heavy crudes" while almost as bad are somewhat lighter crudes which contain less asphalt, but even more metal. Each type of resource will be briefly reviewed.

Heavy Crudes

Extensive reserves of petroleum in the form of so-called "heavy crudes" exist in a number of countries, including Western Canada, Venezuela, Russia, the United States and elsewhere. Many of these reserves are located in relatively inaccessible geographic regions. The United Nations Institute For Training And Research (UNITAR) has defined heavy crudes as those having an API gravity of less than 20, suggesting a high content of polynuclear compounds and a relatively low hydrogen content. The term "heavy oil" whenever used in this specification means an oil having an API gravity of less than 20 and includes both heavy crude oil and heavy petroleum fractions such as petroleum residue produced from the distillation of crude oil. In addition to a high specific gravity, heavy crudes in general have other properties in common including a high content of metals, nitrogen, sulfur and oxygen, and a high Conradson Carbon Residue (CCR). The heavy crudes generally are not fluid at ambient temperatures and do not meet local specification for pipelineability. It has been speculated that such crudes have resulted from microbial action which consumed alkanes leaving behind the heavier, more complex structures which are now present.

A typical heavy crude oil is that recovered from tar sands deposits in the Cold Lake region of Alberta in northwestern Canada. The composition and boiling range properties of a Cold Lake crude (as given by V. N. Venketesan and W. R. Shu, J. Canad. Petr. Tech., page 66, July–August 1986) is shown below.

High Metal Content Crudes

Although considerably lighter than the "heavy crudes", the high metal content crudes such as Mayan crude present similar processing difficulties. The high metals crudes are those which are difficult to process by conventional catalytic methods such that at least the highest boiling portions of these crudes are thermally upgraded by coking or visbreaking. Generally the heaviest fractions, which contain most of the metal, are separated from the lighter fractions by fractionation or vacuum fractionation to recover a gas oil or vacuum gas oil and lighter fractions which with difficulty can be upgraded catalytically.

Unfortunately, the lighter fractions obtained from high metals crudes still contain relatively large amounts of metals. Although the gas oil and vacuum gas oil fractions can be upgraded in, e.g., an FCC, the metal content of such gas oils is so high that some form of metals passivation, or hydrotreating of the feed to remove metals, is usually necessary.

Heavy oils are not extensively used as a refinery feed in part because their viscosity is too high for transmission through a pipeline and in part because their metals content, especially nickel and vanadium, is too high. Nickel and vanadium are present as stable nitrogen complexes in the form of porphyrins, which cause severe refinery problems, poison catalysts and are detrimental to the quality of finished products.

The progressive depletion and rising cost of high quality crudes has created a need for a process for inexpensively converting heavy oils to pipelineable syncrudes, preferably in a way that will not make downstream processing operations more difficult. Such a process would augment the supply of available crude and would make it possible for refiners to blend syncrude with a more conventional feed for catalytic cracking and hydrocracking.

Heavy oils can be pumped through heated pipelines but this requires the expenditure of a considerable amount of energy. Hence, heavy oils are usually treated by processes such as visbreaking, coking and deasphalting. A description of these processes may be found in Modern Petroleum Technology, Fourth Edition, edited by Hobson & Pohl, pp. 281 to 288 and 422 to 423.

However, these processes are accompanied by certain drawbacks. Visbreaking, i.e., viscosity breaking, is a relatively mild thermal cracking process which yields reduced viscosity products. However, with most heavy oils conventional visbreaking yields incompatible two phase products. Coking is a more severe thermal cracking process which converts residual oils such as pitch and tar into gas, naphtha, heating oil, gas oil and coke. Coking requires a large refinery operation. Deasphalting produces low yields of pipelineable oil.

Fractionation to concentrate the lighter portions of the whole crude is somewhat effective but the fractionation itself changes the crude causing metals to migrate into the lighter fractions. The gas oil or vacuum gas oil fractions obtained by fractionation are believed to be more contaminated with metal than can be accounted for by assuming that all, or almost all, of the metals are associated with the asphaltic residual portion of the crude.

Hydrotreatment has been used as a method for upgrading heavy oil and catalysts employed therein include CoMo/alumina and activated carbon.

U.S. Pat. No. 3,715,303 discloses the use of activated carbon as a catalyst in the hydrotreatment of residual hydrocarbons. A required component of the catalyst described therein in an alkali or alkaline earth metal compound such as potassium hydroxide to render the catalyst basic.

U.S. Pat. No. 3,812,028 discloses the use of an activated carbon catalyst for the hydrotreatment of a feed containing polynuclear aromatic compounds by passing the feed through a reaction zone maintained at an elevated temperature and at a hydrogen partial pressure in excess of 2200 psig, and including a catalyst composited of activated carbon and a metallic component.

U.S. Pat. No. 4,518,488 discloses a process for hydrotreating feedstocks containing asphaltenes using a catalyst composited from a porous carbon matrix with a uniform dispersion of metal thereon.

U.S. Pat. No. 4,988,434 discloses a process for reducing metal contaminants in a hydrocarbonaceous liquid, e.g., atmospheric bottoms, by contacting the liquid with an activated-carbon supported catalyst.

SUMMARY OF THE INVENTION

A goal of the process of the present invention is to upgrade heavy oil to facilitate its pipeline transportation and further processing. The upgrading includes reducing the Conradson Carbon Residue value, reducing the amount of high boiling (e.g. 1000° F.+) fraction of the oil, demetallation and, optionally, desulfurization and asphaltene conversion. More particularly, an object of the present invention is to increase the catalyst life and efficacy of the activated carbon used for demetallation.

The foregoing is accomplished by means of the hydrotreating process of this invention which comprises hydrotreating a heavy oil feedstock in the presence of a hydrotreating catalyst composition containing activated carbon, the carbon having an average pore diameter of from about 15 Å to about 70 Å and a pore diameter distribution which includes substantially greater pore area and pore volume in the pore diameter range of from about 100 Å to about 400 Å.

The catalyst composition can also comprise a molybdenum or tungsten component, and a cobalt or nickel component.

The hydrocarbon oil feedstock is, for example, a 650° F.+ boiling atmospheric distillation residuum. The hydrotreating process typically achieves at least about a 23% reduction of the original metal content (i.e. Ni and V content) together with significant reductions in the sulfur content and Conradson Carbon Residue.

The demetallation and upgrading properties of the activated carbon catalysts are deleteriously subject to catalyst aging. When metals such as nickel and vanadium deposit on carbon catalysts they do not penetrate the core of the catalyst because of diffusion limitations. Thus, the interior of the demetallation catalyst is ordinarily not used to its theoretical capacity. Accordingly, it would be desirable to provide a process which utilizes the catalyst more closely to its theoretical capacity.

The present invention relates to a process for hydrotreating a hydrocarbon oil feedstock in the presence of a carbon-reactive oxidant and a catalyst composition comprising activated carbon possessing a pore volume in the 100 Å to 400 Å pore diameter range of at least about 0.08 cc/g and an average pore diameter of from about 15 Å to about 100 Å, wherein said oxidant reacts with the activated carbon to form additional carbon surface area during said hydrotreating. Such surface area can be increased by at least 1%, 5%, 10% or even 25% or more. The process results in increased demetallation capacity of the activated carbon catalyst.

The present invention utilizes the addition of a carbon-reactive oxidant, such as $H_2O$ (steam), $O_2$, and/or $CO_2$, to the hydrotreating process in order to extend catalyst life by inducing reactions, e.g., steam-carbon reactions, in the carbon catalyst component in order to bring about the formation of additional surface area of the activated carbon during hydrotreating. The demetallation capacity of the carbon component is increased as a result of the constantly developing pore structure therein. Metal present in the outer part of the carbon catalyst particle can be oxidized thereby exposing fresh carbon in the catalyst particle interior. Furthermore, besides developing additional pore structure, the use of steam with a cobalt/molybdenum or nickel/tungsten carbon catalyst can cause migration of such metals into the newly developing pores by the formation of sulfide species, e.g., $MoS_x$ and $CoS_y$, into mixed oxide-sulfide species.

DETAILED DESCRIPTION OF THE PREFERRED EMBODIMENTS

Figure 1:
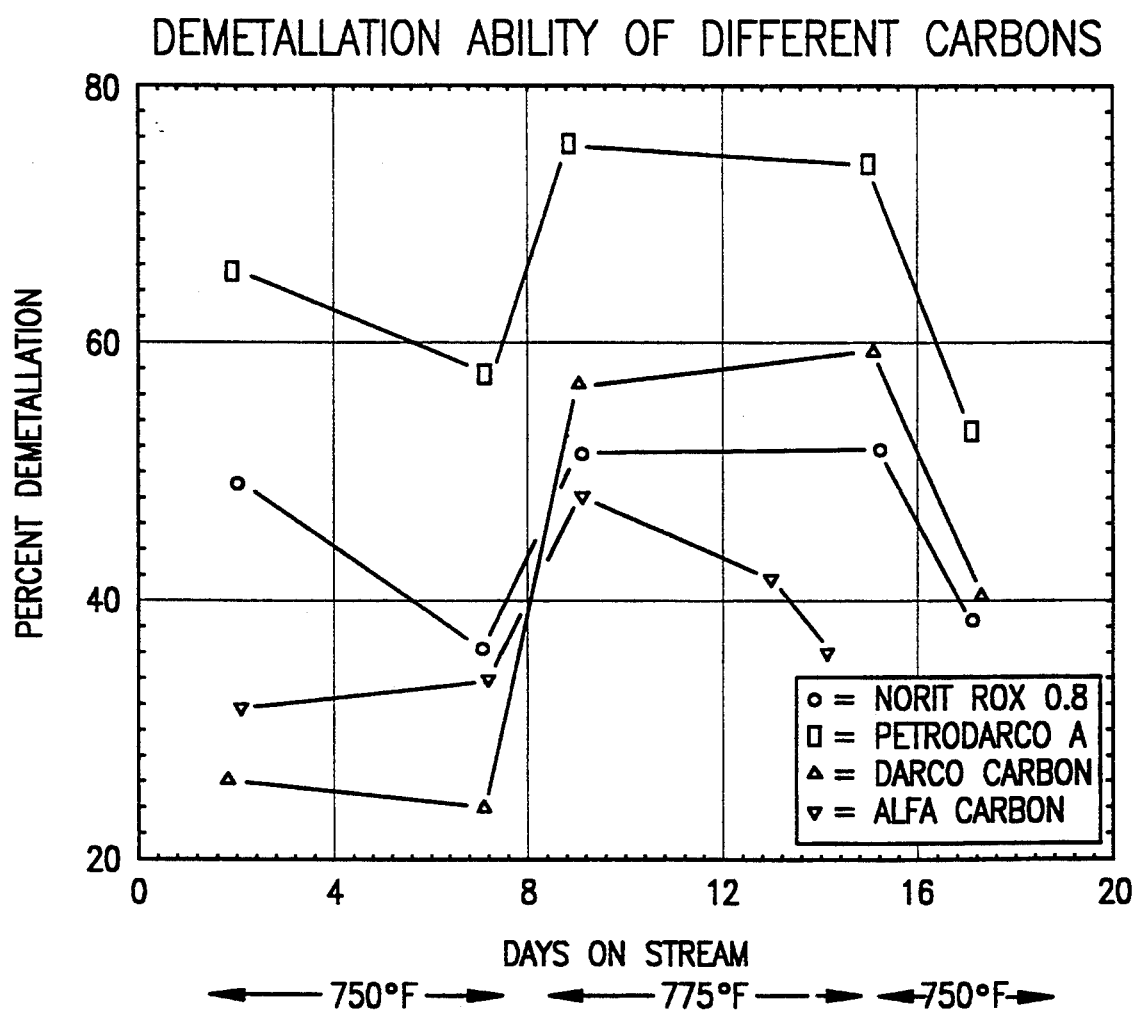
FIG. 1 is a graph illustrating the demetallation capability of different activated carbon hydrotreating catalysts.

In accordance with a preferred embodiment of the present invention, a heavy hydrocarbon oil is upgraded by a hydrotreating process using an activated carbon catalyst. As indicated above, by "heavy oil" or "heavy hydrocarbon oil" is meant a hydrocarbon oil with an API gravity of less than about 20. The hydrocarbon oil undergoes visbreaking, demetallation, and reduction of carbon residue (as measured by Conradson Carbon Residue, "CCR"). Some desulfurization and asphaltene conversion also occurs. The upgraded product can then be used as feed to a fluid catalytic cracker.

Feedstock

The heavy hydrocarbon oil feedstock used in the present invention can be, for example, heavy crude oil, vacuum or atmospheric distillation residuum or various other fossil fuels such as tars and oil or shale oil. Light oils can also be treated with the catalyst composition of the present invention to reduce the content of unwanted metals such as nickel and vanadium.

The soluble components include all of the light components of the crude and the heavier components which are readily soluble in aliphatic solvents. Asphaltenes are generally insoluble in aliphatic solvents. The asphaltene fraction from a whole heavy crude can contain almost all of the metals depending upon solvent used for deasphalting. The maltene fraction will have a greatly reduced metals content compared to the asphaltene fraction. The maltenes are somewhat soluble in aliphatic solvents, depending on deasphalting conditions.

The heavy oils contemplated for use herein have very little light components boiling below 650° F. and an abundance of 650° F. + material and asphaltenes. In general terms, the whole crudes contemplated for use herein will have a 50 wt. % boiling point at atmospheric pressure in excess of about 650° F. Frequently, the 40% and even the 30 volume % boiling points of such crudes will exceed 1000° F. such that the crudes will be considered non-distillable. Most heavy crudes are asphaltenic in nature but a few are not. Asphaltenic crudes contain a high proportion of naphthenic and aromatic components and a low paraffin content and are characterized by a low API gravity, e.g., of less than about 30 for the whole crude and less than about 20 API gravity for the 650° F. + fraction. Whole crudes have a CCR content usually in excess of about 10 wt % and a pentane insoluble asphaltene content of at least about 10 wt % (using 10:1 pentane:oil). Many of the heavy crudes have a specific gravity above about 0.9. The 650° F. + fraction of some heavy crudes is so heavy that the specific gravity is about 1.0 (an API gravity of less than about 10) and will sink, not float, in water. More than 25% of the crude boils above 1000° F.

The heavy oils generally contain large amounts of metals such as nickel and vanadium, much, and usually most of which, are coordinated by porphyrin or "porphyrin like" structures. These porphyrins or "porphyrin like" structures coordinate Ni and V in complex aromatic structures that are asphaltic in nature. Typically, heavy oils contain more than 5 ppm by weight of Ni and more than 25 ppm by weight of V on a whole crude basis. The porphyrins undergo degradation reactions which disrupt the aromaticity of the porphyrin rings and transform metal-coordinated porphyrin or metalloporphyrins into metal-coordinated polypyrrolic species. More details on such heavy crudes and porphyrin degradation reactions are provided in "Degradation of Metalloporphyrins in Heavy Oils Before and During Processing" L. A. Rankel, Fossil Fuels Geochemistry, Characterization and Processing, ACS Symposium Series No. 344, Chapter 16, (ACS) 1987 ed. R. H. Filby and J. F. Branthayer, which is incorporated herein by reference.

Typical feedstocks, a heavy oil (a Cold Lake crude, Lower Grand Rapids) and a topped Mexican heavy crude (Mayan 650° F. + Primary Production) are shown below. The similarities are evident.

| PROPERTIES OF 650° F. FRACTIONS | | |
|---|---|---|
| | Mayan | Cold Lake |
| % C | 84.0 | 83.8 |
| H | 10.4 | 10.3 |
| N | 0.06 | 0.44 |
| O | 0.97 | 0.81 |
| S | 4.7 | 4.65 |
| CCR | 17.3 | 12.3 |
| % C7-Insoluble | 18.5 | 15.0 |
| Ni, ppm | 78 | 74 |
| V, ppm | 372 | 175 |
| Boiling Range: | | |
| 75–400° F. | 0.62 | 1.3 |
| 400–800° F. | 21.7 | — |
| 400–650° F. | — | 15.2 |
| 800–1050° F. | 19.0 | — |
| 650–1000° F. | — | 29.7 |
| 1050° F.+ | 58.71 | — |
| 1000° F.+ | — | 53.8 |

Typical levels of (Ni+V) in the heavy oils contemplated for use herein will exceed 50 wt ppm (total Ni+V), and frequently will exceed 100 or even 150 wt ppm (Ni+V) based on the whole crude. There is no physical upper limit on metals concentrations contemplated for use herein.

The heavy oils usually contain relatively large amounts of sulfur which is advantageously reduced by the method of the present invention.

Carbon-Reactive Reductant

The present invention utilizes at least one suitable carbon-reactive reductant which reacts with the activated carbon catalyst in such a way as to increase its surface area. Various reductants can be employed to effect such surface area enhancement, such as $H_2O$ (or steam), carbon dioxide ($CO_2$), or oxygen-containing gas, e.g., air. Carbon can be reacted with these reductants as shown below:

(1) $C + 2H_2O \rightarrow 2H_2 + CO_2$
(2) $2C + 2H_2O \rightarrow CH_4 + CO_2$
(3) $C + CO_2 \rightarrow 2CO$
(4) $C + O_2 \rightarrow CO_2$.

Reaction Conditions

The reactor can be of the fixed bed type or a fluidized or moving bed reactor. A trickle bed type reactor is preferred.

Processing may be carried out at a temperature of from about 500° F. to about 1200° F., a pressure of from about 0 psig to about 4000 psig, and a weight hourly space velocity (WHSV) of from about 0.1 to about 10 hr-1.

Processing conditions preferably include a temperature range of from about 600° to about 1000° F., a pressure of from 500 to about 2500 psig, and a WHSV of from about 0.2 to about 5 hr-1.

Hydrogen circulation can range from about zero to about 40,000 SCF $H_2$/bbl of feed depending on hydrogenation activity. Typically, the range of hydrogen circulation of the present method is from about 300 SCF/bbl to about 6000 SCF/bbl.

Steam can be added to heated feed upstream of the reactor or water can be added to the feed and the steam generated in the reactor. Water or steam can be added continually or intermittently as needed to improve the activity of the carbon catalyst. Typically, steam is added to provide a steam partial pressure of 1 to 3000 psig, preferably 10 to 1000 psig, e.g., 20 to 800 psig. Alternatively, water or steam can be added directly to the reactor. Carbon dioxide can be added in like manner. In one embodiment, feed and hydrogen can be discontinued for a short time, the reactor flushed with $N_2$ or $CO_2$ and then carbon dioxide, steam or oxygen is fed to the reactor in order to develop new pore structure for the catalyst. Hydrogen cannot be present in the reactor when air or $O_2$ is being used.

Figure 7:
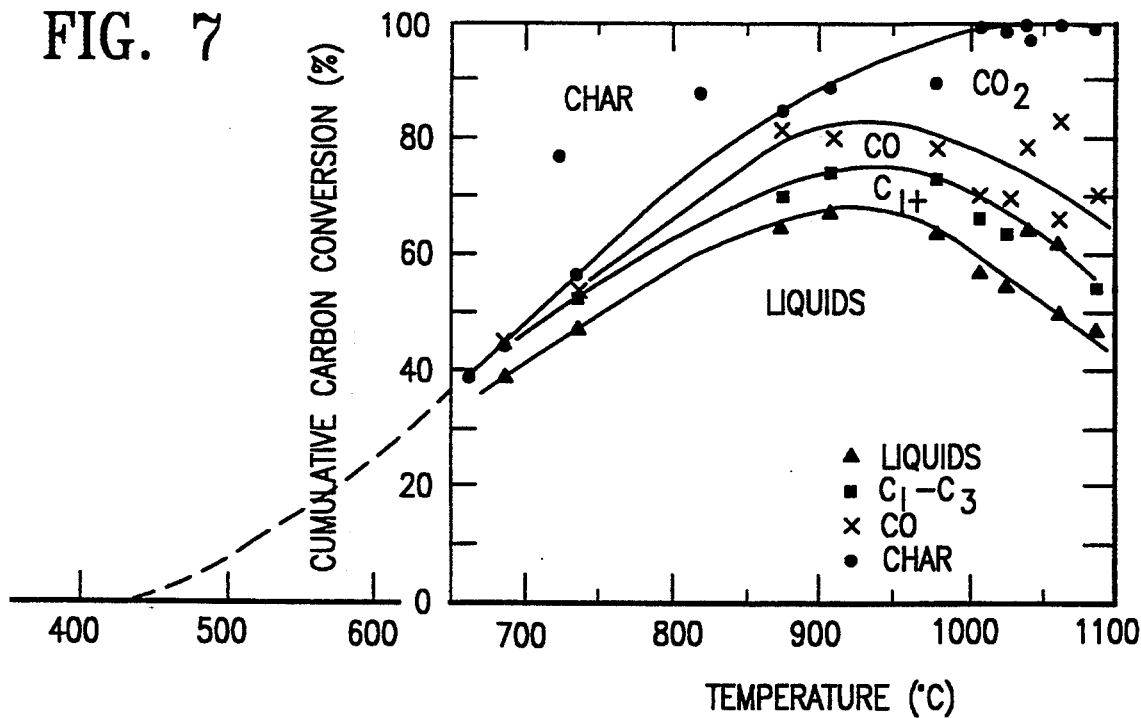
FIG. 7 is a depiction of extrapolated data indicating that steam will react with carbon at hydrotreating conditions.
Figure 8:
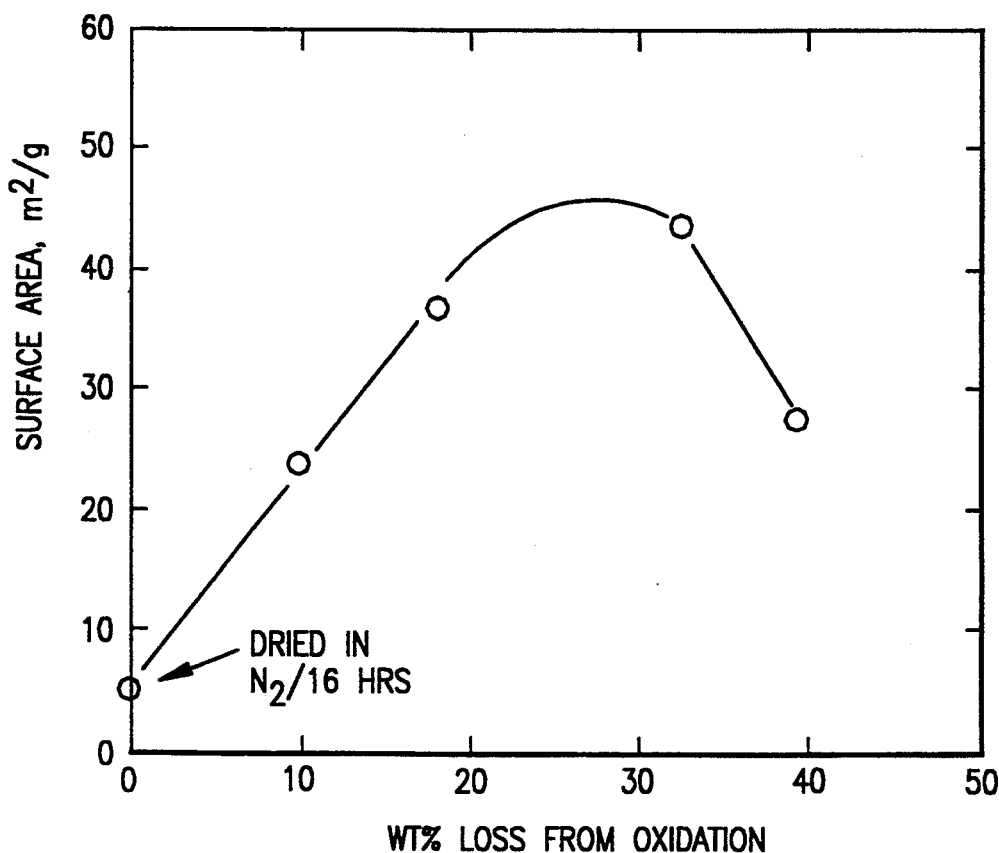
FIG. 8 is a graph of carbon catalyst surface area ($m^2/g$) versus wt % loss from air oxidation of shot coke. The figure shows that air oxidized shot coke with less than 5 $m^2/g$ of surface area can increase its surface area by a factor of 5 with a 10% weight loss in carbon.
Figure 9:
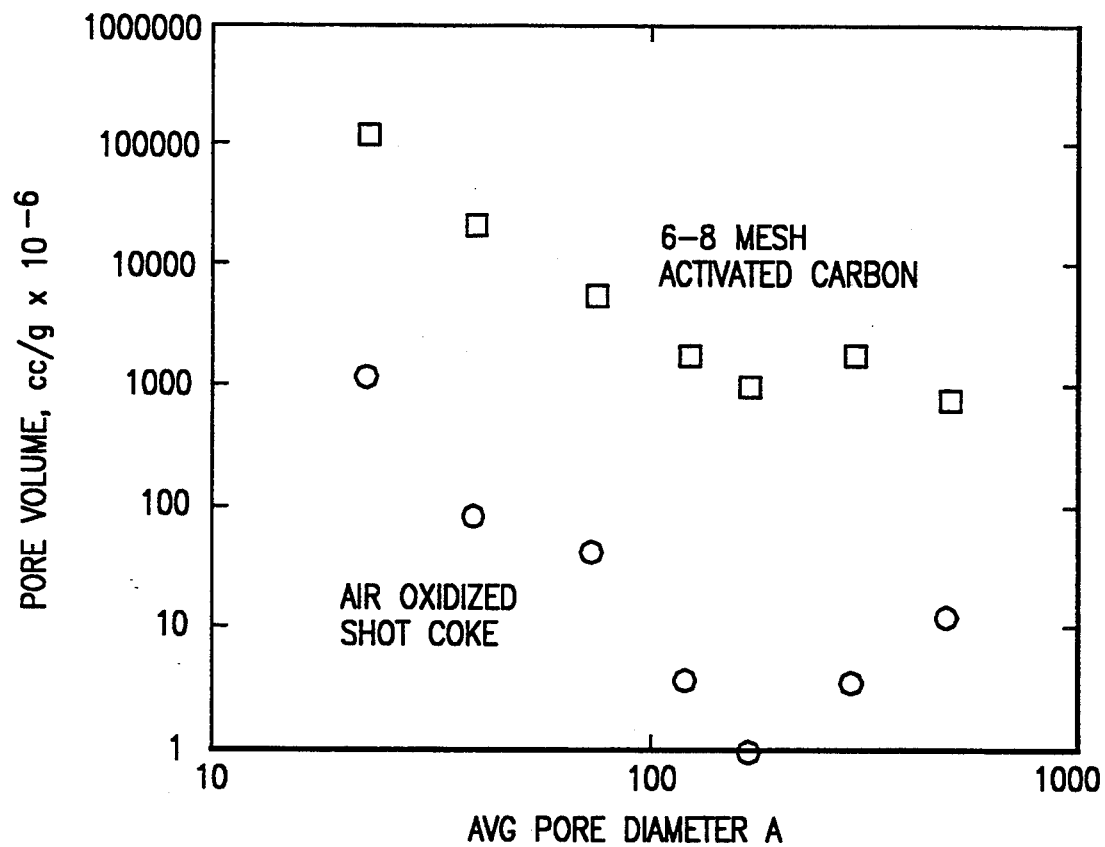
FIG. 9 is a graph comparing pore volume ($cc/g \times 10^{-6}$) with average pore diameter of air oxidized shot coke with 23 $m^2/g$ surface area vs. 6-8 mesh activated carbon with 987 $m^2/g$. The figure shows that a shot coke sample with no measurable pore volume has developed a pore structure from air oxidation with some pores having a pore diameter above 100 Å.
Figure 10:
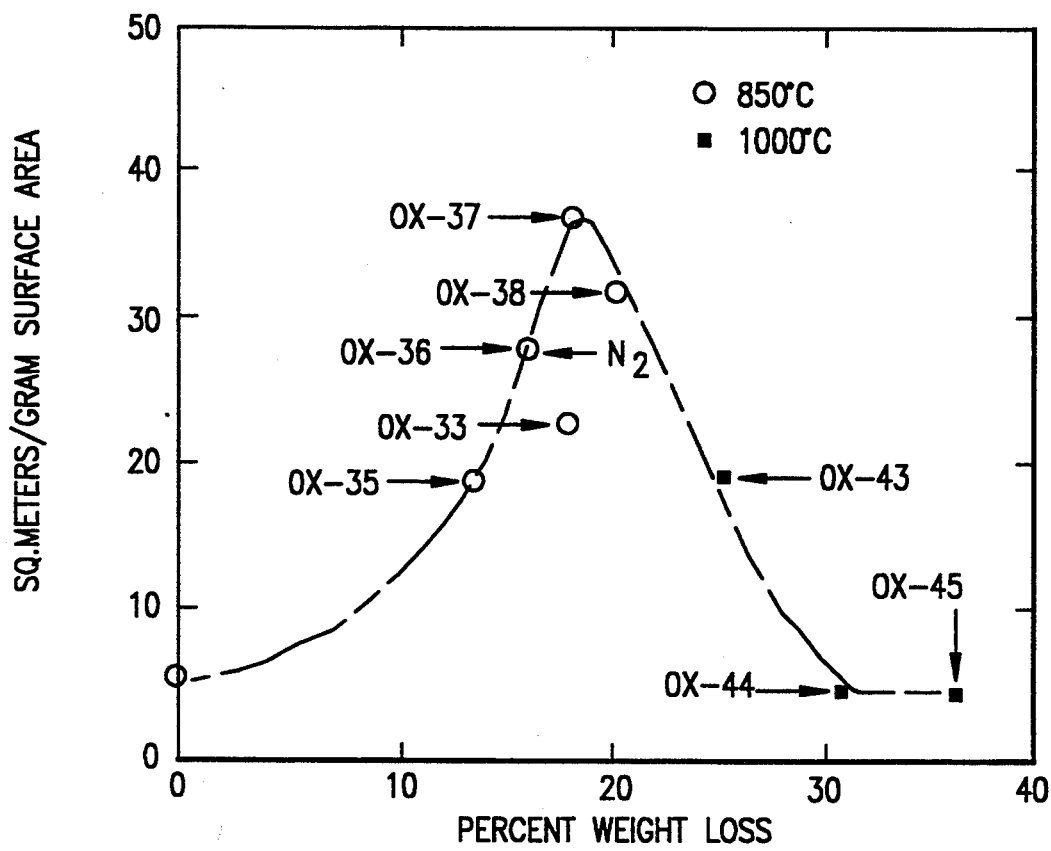
FIG. 10 is a graph of carbon catalyst surface area ($m^2/g$) versus wt % loss from oxidation for a shot coke subjected to carbon dioxide oxidation which shows surface areas similar to those from air oxidation.

The addition of steam results in the steam-carbon reaction taking place in or on the carbon component of the catalyst. P. L. Walker, "Advances in Coal Utilization Technology", Institute of Gas Tech , May 14–18, 1979, Louisville, Ky., Chapter 13, provides data showing the effect of pressure and temperature on steam reactions with Illinois No. 6 coal. Extrapolation of these data (see FIG. 7) indicates that at temperatures below 500° C., at least 50 atmospheres of pressure are required. Accordingly, it is shown that, for present purposes, pressures of 50 to 3000 psig, preferably 500 to 2500 psig, e.g., 700 to 2000 psig are required for hydrotreating and in this regime, water or steam addition will cause reaction with carbon (see Table A).

Steam-carbon reaction promoters can greatly facilitate the steam-carbon reaction. The addition of KOH to graphite causes atmospheric pressure steam reactions at 400° to 600° C., according to F. Delannay, et al., Appl. Catalysis, 10, 111 (1984). Pereira, et al., J. Cat., 123, 463 (1990) teach that K—Ca—$O_x$ catalysts can be added to effect low temperature steam-carbon reactions. Klaus J. Huttinger, et al., Fuel, Vol. 64, p. 491 (1985) describe the melting and wetting behavior of various alkali compounds in catalytic water vapor gasification of carbon. Accordingly, it is within the scope of the present invention to employ steam-carbon reaction promoters as necessary to promote steam-carbon reactions under the hydrotreating process conditions used herein. Typically, such promoters can be added by weight percent ranging from 0.001 to 5%, preferably 0.1 to 2% of promoter in the catalyst.

It may not be necessary to add promoters to the carbon catalysts to facilitate the steam-carbon reaction. These activated carbons can already contain K, Fe, Ca, Ni, Li, and V (see Table B, below for all the metals), which are metals known to promote the steam-carbon reaction (see Ed. Peter A. Thrower, Chemistry and Physics of Carbon, Vol. 21, Marcel Dekker, 1989). If promoters are to be added, compounds or salts with the following metals can be used: K, Ca, Ni, V, Ba, Mg, Mn, Zn, and P.

TABLE A

| Carbon Catalyst Properties Comparison | | | |
|---|---|---|---|
| | Alfa Carbon | Shot Coke | Darco Carbon |
| Surface Area, m²/gm (M-374) | 946 | <5 | 712 |
| Real Density, gm/cc (M-1502) | 2.072 | 1.352 | 1.990 |
| Particle Density, gm/cc (M-1503) | 1.023 | 1.286 | .676 |
| Pore Volume (M-1504) | .495 | .038 | .977 |
| Average Pore Diameter, A (M-1505) | 20 | —* | 54 |
| Alpha Value | ~4.8 | | ~3.0 |
| C, % | 90.4 | 88.2 | 81.1 |
| H, % | <0.5 | 2.6 | 1.1 |

TABLE A-continued

| Carbon Catalyst Properties Comparison | | | |
|---|---|---|---|
| | Alfa Carbon | Shot Coke | Darco Carbon |
| N, % | 0.9 | 3.76 | 7.6 |
| S, % | 0.9 | 1.89 | 0.5 |
| Ash, % | 3.4 | 1.33 | 10.0 |
| Fe, % | 0.3 | 0.12 | 0.3 |
| $Al_2O_3$, % | 1.1 | | 3.5 |
| $SiO_2$, % | 1.3 | | 10.0 |
| Cu, ppm | 0.47 | | 40 |
| K, % | 0.24 | | .0025 |
| V, ppm | 54 | | — |
| Ca, % | 0.37 | | 0.2 |
| Li, ppm | <50 | | <48 |
| Mg, % | .013 | | .096 |
| Ni, % | | .08 | |

*could not be measured

As noted above, $CO_2$ can also be used to effect oxidation of the carbon catalyst. Treatment with $CO_2$ can be carried out at temperatures of 300° to 800° C., preferably 400° to 600° C. at $CO_2$ partial pressures ranging from 1 to 1000 psig, preferably 50 to 500 psig. Preferably, the catalyst is treated so that no greater than 20 percent of its weight is lost over the lifetime of the catalyst, in order to avoid surface area losses or collapse of the catalyst particle.

Air or $O_2$ can also be used to effect oxidation of the carbon catalyst. Treatment with $O_2$ can be carried out at temperatures of 300° to 800° C., preferably 400° to 700° C. at $O_2$ partial pressures ranging from 1 to 300 psig, preferably 10 to 500 psig. Preferably, the $O_2$ is provided in the form of air. However, if air or oxygen is used, the hydrogen flow to the reactor must first be stopped and the reactor flushed out with $N_2$ or $CO_2$ to remove the hydrogen before air flow is begun.

The feed is initially heated to render it fluid so that it can be piped into the reactor.

Hydrotreating Catalyst

The activated carbon hydrotreating catalyst of the present invention possesses a pore volume in the 100 Å to 400 Å pore diameter range of at least about 0.08 cc/g and preferably at least about 0.2 cc/g and an average pore diameter of from about 15 Å to about 100 Å and preferably from about 40 Å to about 90 Å. Advantageously, the activated carbon possesses the additional properties set forth in Table 1. This activated carbon is neat, i.e., contains no additional material.

TABLE 1

| | Broad Range | Preferred |
|---|---|---|
| Crush Strength, lbs | ≧8.0 | ≧11.0 |
| Surface area, m²/g | 100 | 200–800 |
| Real density, g/cc | 1.9–2.2 | 1.9–2.2 |
| Particle density, g/cc | 0.6–1.0 | 0.6–1.0 |
| Mesh Size | 2–100 | 4–20 |
| Alpha Value | 2.9–7 | 3.0–6 |
| Pore area in the 100 A to 400 A pore diameter range | ≧18 | ≧50 |

Average pore diameter and other above properties are determined by the following methods.

Real density was determined by gas pychnometry using a Micromeritics Autopychnometer 1320.

The particle density of a catalyst or similar porous material can be determined by measuring the amount of mercury necessary to fill a container of known volume after a sample of known weight has been introduced.

Mercury does not "wet" most porous solids and, as a result, will not enter its pores. In this method, mercury is allowed to flow into the sample tube under atmospheric pressure (14.7 psia). At this pressure only pores with a diameter, d, greater than about 150,000 A, or 15 microns, will be filled. This estimate of minimum pore diameter is based on the following equation:

$$d = (4 \gamma \cos \Theta) + P$$

where $\gamma$ is the surface tension of mercury, $\Theta$ is the wetting or contact angle of mercury, and P is the pressure applied to mercury for pore penetration. This equation reduced to:

$$d215.1 + P = 215.1 + 14.7 \approx 15 \text{ microns}$$

wherein d and P are expressed in units of microns and psia, respectively.

The pore volume is determined as follows:

$$\text{Pore Volume cc/g} = \frac{1}{(D_p)} - \frac{1}{(D_r)}$$

wherein $D_p$ = particulate density, g/cc
$D_r$ = real density, g/cc

Calculation of the average pore diameter is determined as follows:

$$\text{Average Pore Diameter, } A = \frac{PV \times 4 \times 10^4}{SA}$$

where PV = pore volume, cc/g
SA = surface area, m²/g

The surface area, expressed as m²/g, was determined by the amount of a monomolecular layer of $N_2$ adsorbed onto a sample between ice and liquid $N_2$ temperature. A Micromeritics 2200 Surface Area Analyzer was used for this measurement.

A Micromeritics Digisorb 2600 instrument was used to determine pore diameter distribution. The adsorption and desorption isotherms for nitrogen at different pressures were plotted and pore size and pore area distribution was calculated.

When Alpha value is examined, it is noted that Alpha value is an approximate measure of the catalytic cracking activity of a catalyst compared with a standard catalyst and it gives the relative rate constant (rate of normal hexane conversion per volume of catalyst per unit time). It is based on the activity of the highly active silica-alumina cracking catalyst taken as an Alpha of 1 (Rate Constant = 0.016 sec-1). The Alpha value test is described in U.S. Pat. No. 3,354,078 in the Journal of Catalysis, Vol. 4, p. 527 (1965); Vol. 6, pg. 278 (1966); and Vol. 61, p. 395 (1980), each incorporated by reference as to that description. The experimental conditions of the test used herein include a constant temperature of 538° C. and a variable flow rate as described in detail in the Journal of Catalysis, Vol. 61, p, 395. Alpha values were measured in atmospheres of helium and hydrogen.

Alpha values give an indication of the acid cracking sites of a catalyst, i.e., the higher the Alpha value the higher the acid cracking activity. The activated carbon used in the present invention may optionally contain, or be associated with, one or more components to improve cracking activity, such as silica and/or alumina.

The activated carbon of the present invention is preferably prepared from lignite. Coals, such as anthracite, bituminous coal, and lignite are classified according to moist, mineral-matter-free energy content in accordance with the measuring requirements set by ASTM Standard D 388. In this method of classification, lignite has a moist energy of less than 8300 BTU/lb. A lignite based activated carbon suitable for use in the method of the present invention is Darco® brand carbon available from American Norit Company, Inc., of Jacksonville, Fla. Another lignite based activated carbon suitable for use in the method of the present invention is designated as Pettedarco A ™ and is also available from American Norit Company Inc.

Other types of lignite based activated carbons are commercially available but are outside the scope of this invention. Thus, for example, Alfa ™ (Alfa Products, Danvets, Mass.), an activated carbon which does not possess the requisite pore distribution properties of the activated carbon catalyst employed in the process of the present invention, is inferior to the catalysts herein.

Non-lignite based activated carbons may also be used in the method of the present invention provided they possess suitable pore properties. For example, a peat based activated carbon designated as Norit Rox ™ 0.8 is available from American Norit Company and is suitable for use in the hydrotreating process of the present invention.

One surprising result is the effectiveness of a relatively small average pore diameter. Compared with cobalt-molybdenum on alumina (CoMo/Al2O3), which has an average pore diameter of over 70A, Darco® carbon has an average pore size of about 54A.

The pore volume distribution is an important factor to consider with respect to activated carbons. It has been found that the pore volume distribution in the 79A to 500A pore diameter range is particularly important with respect to treating processes for heavy oil to facilitate the catalytic reaction or large oil molecules. Heavy oils contain molecules with diameters greater than 50A, a significant percentage of which have diameters in the 200A to 400A range. Large pores in the catalyst can accommodate the molecules of this size range thereby facilitating demetallation, desulfurization, catalytic cracking and hydrogenation at the pore sites.

Table 2 sets forth the pore distribution comparison of Darco® carbon, Alfa ™ carbon, alumina, Petrodarco A ™ carbon and Norit Rox ™ 0.8 carbon. Both the incremental pore volumes and incremental pore areas are compared. As can be seen, Darco® carbon has significant catalyst surface area in the 100A to 400A range.

TABLE 2

| | | | | | |
|---|---|---|---|---|---|
| CoMo ON ACTIVATED CARBON | | | | | |
| Desorption Pore Distribution | | | | | |
| Pore Diameter Range (Å) | Average Diameter (Å) | Incremental Pore Vol. (cc/g) | Cumulative Pore Vol. (cc/g) | Incremental Pore Area (sq. m/g) | Cumulative Pore Area (sq. m/g) |
| Co/Mo Darco® Carbon | | | | | |

TABLE 2-continued

CoMo ON ACTIVATED CARBON
Desorption Pore Distribution

| Pore Diameter Range (Å) | Average Diameter (Å) | Incremental Pore Vol. (cc/g) | Cumulative Pore Vol. (cc/g) | Incremental Pore Area (sq. m/g) | Cumulative Pore Area (sq. m/g) |
|---|---|---|---|---|---|
| 600–400 | 500 | 0.011864 | 0.011864 | 0.996 | 0.996 |
| 400–200 | 300 | 0.054064 | 0.065928 | 8.584 | 9.580 |
| 200–150 | 175 | 0.045044 | 0.110972 | 10.631 | 20.210 |
| 150–100 | 125 | 0.067192 | 0.178163 | 22.608 | 42.818 |
| 100–50 | 75 | 0.124167 | 0.302330 | 72.910 | 115.728 |
| 50–30 | 40 | 0.144508 | 0.446839 | 148.471 | 264.199 |
| 30–15 | 22.5 | 0.056684 | 0.503528 | 111.886 | 376.084 |
| Co/Mo Alfa ™ Carbon | | | | | |
| 600–400 | 500 | 0.001542 | 0.001542 | 0.141 | 0.141 |
| 400–200 | 300 | 0.002465 | 0.004007 | 0.373 | 0.513 |
| 200–150 | 175 | 0.001198 | 0.005205 | 0.277 | 0.790 |
| 150–100 | 125 | 0.001708 | 0.006913 | 0.585 | 1.376 |
| 100–50 | 75 | 0.005562 | 0.012475 | 3.097 | 4.473 |
| 50–30 | 40 | 0.019280 | 0.031855 | 21.073 | 25.546 |
| 30–15 | 22.5 | 0.157588 | 0.189443 | 353.340 | 388.886 |

Table 3 sets forth the pore volumes and pore areas in the 100Å to 400Å pore diameter range. For example, comparing pore area in the 100Å to 400Å pore diameter range (see Table 3), Darco ® carbon has a pore area of 52.103 m²/g whereas Alfa ™ carbon has 1.226 m²/g in the same range and alumina has a pore area of 6.165 m²/g in the same pore diameter range. With respect to pore volume, Darco ® carbon has a pore volume of 0.205864 cc/g in the 100Å to 400Å pore diameter range, whereas Alfa ™ carbon has a 0.005136 cc/g in that range, and alumina has a pore volume of 0.02422 cc/g in the 100Å to 400Å pore diameter range.

TABLE 3

Pore Volumes and Pore Areas in the 100 A to 400 A Pore Diameter Range

| | Pore Volume (cc/g) | Pore Area m₂/g |
|---|---|---|
| Darco ® | 0.205864 | 52.103 |
| Petrodarco ™ A | 0.204596 | 49.118 |
| Norit Rox ™ 0.8 | 0.085919 | 18.649 |
| Alfa ™ | 0.005136 | 1.226 |
| Alumina | 0.02422 | 6.165 |

The following examples illustrate a comparison of the hydrotreating catalyst of the present invention as exemplified by Darco ®, Petrodarco A ™, and Norit Rox ™ 0.8 in comparison with CoMo/Al03, Alfa ™ activated carbon, and shot coke (a non-activated carbon) with respect to the demetallation of 650° F.+ residue feedstock. CoMo/Al₂O₃ is a commonly used catalyst for hydroprocessing. The results show that neat activated carbons compare favorably with CoMo/Al₂O₃ in term of the effectiveness of converting high boiling fractions of the feedstock and in terms of demetallation and reduction of Conradson Carbon Residue. Use of activated carbon is advantageous because it is less expensive than CoMo/Al₂O₃ and the removed metals can be easily recovered by combusting the catalyst after use to obtain a metals rich ash that can be acid extracted for metals recovery or disposed of with reduced weight and volume as compared to an alumina based catalyst. Since catalysts are usually disposed of in landfills, the environmental impact as well as the disposal costs can be reduced by about 50% to 75%.

EXAMPLE 1

A 650° F.+ atmospheric distillation residue fraction was provided for use as feedstock in the following examples. The feedstock has the properties set forth in Table 4, below.

TABLE 4

| 650° F.+ Resid | |
|---|---|
| Carbon, % | 84.07 |
| Hydrogen, % | 10.65 |
| Nitrogen, % | 0.30 |
| Oxygen, % | 0.81 |
| Sulfur, % | 4.23 |
| CCR, % | 12.03 |
| Asphaltenes (Pentane insolubles), % | 15.97 |
| Nickel, ppm | 32 |
| Vanadium, ppm | 104 |
| B.P. Range °F. | Fraction |
| 420–650 | 2.50% |
| 650–850 | 29.25% |
| 850–1000 | 19.54% |
| 1000+ | 48.71% |

The feedstock of Table 4 was hydrotreated in a trickle bed micro unit reactor of standard design at 1500 psig H₂ partial pressure, 5800 SCF H₂/bbl. circulation, and 0.5 hr⁻¹ WHSV.

The trickle bed reactor was charged with 11.23 grams of catalyst and 30 cc of sand. The feed delivery was 5.8 cc/hr. Standard presulfiding of the catalyst was employed with 2% H₂S in hydrogen. The run time and temperature protocol was as follows:

1) 750° F. for 7 days
2) 775° F. for 7 days
3) 750° F. for 2 days

The micro unit reactor incorporated a bottoms receiver held at 200° C. to drive off volatiles, a 2° C. liquid cooled trap condensed low boiling component. Gas samples were analyzed with a gas sampling system with bombs. Off gas volumes were measured with a wet test meter.

A CoMo/Al₂₃ catalyst was provided, the catalyst having the properties shown in Table 5 below.

The catalyst was prepared with conventional methodology with the molybdenum incorporated first to prevent the cobalt from forming cobalt-alumina spinel structures.

The feedstock was hydroprocessed with the CoMo/Al₂O₃ catalyst and the demetallation results are set forth in Table 6 below.

TABLE 5

| CoMo/Al₂O₃ Catalyst Properties | |
|---|---|
| Co % | 2.4 |
| Mo % | 8.4 |
| Surface Area, m²/g | about 256 |
| Real Density, g/cc | 3.419 |
| Particle Density, g/cc | — |
| Pore Volume, cc/g | 0.515 |
| Average Pore Diameter, A | 71 |
| Alpha Value | 9.8 |

EXAMPLE 2

A neat Alfa ™ carbon catalyst was provided. The catalyst has the properties shown in Table 7.

The feedstock of Table 4 was hydroprocessed in a trickle bed reactor under the same conditions as those of Example 1 with the exception that 11.28 grams of Alfa ™ activated carbon (without cobalt or molybdenum) was used as the catalyst. The results of the hydroprocessing are set forth below in Table 8.

TABLE 6

Hydroprocessing Results for CoMo/Al₂O₃

| Sample No. | °F. | t (days) | % Conversion[1] | % deM[2] | % deS[3] | % deNi[4] | deV[5] | deCCR[6] | % Asphaltene | % Asphaltene Conversion[7] |
|---|---|---|---|---|---|---|---|---|---|---|
| 1) | 750 | 1.7 | 42.50 | 67.9 | 83.5 | 58.4 | 70.8 | 52.0 | — | — |
| 2) | 750 | 6.9 | 35.03 | 62.9 | 80.8 | 49.5 | 67.1 | 47.2 | — | — |
| 3) | 775 | 8.7 | 55.55 | 76.3 | 84.6 | 68.3 | 78.8 | 56.9 | 7.60 | 52.4 |
| 4) | 775 | 15.3 | 49.77 | 70.6 | 80.6 | 56.4 | 74.9 | 49.5 | — | — |
| 5) | 750 | 16.7 | 35.66 | 55.7 | 71.9 | 37.2 | 61.4 | 42.4 | 10.94 | 31.5 |

[1]Percent reduction of 1000° F.+ fraction in feed
[2]Percent Total Demetallation (Ni + V removal)
[3]Percent Desulfurization
[4]Percent Nickel removal
[5]Percent Vanadium removal
[6]Percent Conradson Carbon Residue reduction
[7]Deasphalted resid using 10 cc pentane: 1 g resid

TABLE 7

| CATALYST PROPERTIES (6-8 Mesh Alfa ™ Carbon) | |
|---|---|
| Surface Area, m²/g | 946 |
| Real Density, g/cc | 2.072 |
| Particle Density, g/cc | 1.023 |
| Pore Volume, cc/g | 0.495 |
| Average Pore diameter, A | 20 |
| Alpha Value | 3.6 |
| C, % | 90.42 |
| H, % | <0.5 |
| N, % | 0.93 |
| S, % | 0.87 |
| Ash, % | 3.39 |
| Fe, % | 0.33 |
| Al₂O₃, % | 1.05 |
| SiO₂, % | 1.29 |
| Cu (ppm) | 0.047 |
| K, % | 0.024 |
| Ni (ppm) | 29 |
| V (ppm) | 49 |
| Cr (ppm) | 66 |
| Cl (ppm) | <13 |
| Na (ppm) | 612 |
| Ca, % | 0.037 |
| Li, (ppm) | <50 |

TABLE 7-continued

| CATALYST PROPERTIES (6-8 Mesh Alfa ™ Carbon) | |
|---|---|
| Mg, % | 0.013 |

EXAMPLE 3

A neat Darco ® carbon catalyst was provided. The catalyst has the properties shown in Table 9.

The feedstock of Table 4 was hydroprocessed in a trickle bed reactor under the same conditions as those of Example 1 with the exception that 11.28 grams of Darco ® 12-20 mesh activated carbon (without cobalt or molybdenum) was used as the catalyst. The results of the hydroprocessing are set forth below in Table 10.

TABLE 8

Hydroprocessing Results for Alfa ™ Carbon (6-8 Mesh)

| Sample No. | °F. | t (days) | % Conversion | % deM | % deS | % deNi | deV | deCCR | Asphaltene | % Asphaltene Conversion |
|---|---|---|---|---|---|---|---|---|---|---|
| 1) | 750 | 1.9 | 17.80 | 30.2 | 19.1 | 22.1 | 32.7 | 20.2 | — | — |
| 2) | 750 | 6.9 | 17.29 | 32.8 | 13.9 | 33.8 | 32.4 | 17.1 | — | — |
| 3) | 775 | 8.9 | 30.15 | 48.0 | 25.8 | 38.9 | 50.8 | 29.8 | 13.04 | 18.3 |
| 4) | 775 | 12.7 | 24.12 | 41.2 | 19.1 | 31.6 | 44.2 | 20.7 | — | — |
| 5) | 750 | 13.8 | 15.78 | 35.4 | 16.8 | 30.6 | 36.8 | 13.5 | — | — |

TABLE 9

| CATALYST PROPERTIES (12-20 Mesh Darco ® Carbon) | |
|---|---|
| Surface Area, m²/g | 712 |
| Real Density, g/cc | 1.990 |
| Particle Density, g/cc | 0.676 |
| Pore Volume, cc/g | 0.977 |
| Average Pore diameter, A | 54 |
| Alpha Value | 2.9 |
| C, % | 81.08 |
| H, % | 1.08 |
| N, % | 7.60 |
| S, % | 0.48 |
| Ash, % | 10.04 |
| Fe, % | 0.25 |
| Al₂O₃, % | 3.45 |
| SiO₂, % | 9.99 |
| Cu (ppm) | 40 |
| K, % | 0.0053 |
| Ni (ppm) | 16 |
| V (ppm) | 37 |
| Cr (ppm) | 15 |
| Cl (ppm) | 1747 |
| Na (ppm) | 1103 |
| Ca, % | 0.22 |
| Li, (ppm) | <48 |
| Mg, % | 0.096 |

EXAMPLE 4

A catalyst was prepared of shot coke which was 30% oxidized in air to increase its surface area to 44 m²/g.

TABLE 10

Hydroprocessing Results for Darco ® Carbon (12–20 Mesh)

| Sample No. | °F. | t (days) | % Conversion | % deM | % deS | % deNi | deV | deCCR | % Asphaltene | % Asphaltene Conversion |
|---|---|---|---|---|---|---|---|---|---|---|
| 1) | 750 | 1.6 | 18.86 | 24.7 | 10.4 | 25.3 | 24.6 | 13.5 | — | — |
| 2) | 750 | 6.8 | 20.94 | 23.0 | 11.8 | 14.6 | 45.6 | — | — | — |
| 3) | 775 | 8.8 | 34.25 | 57.4 | 21.7 | 48.1 | 71.2 | 22.5 | — | — |
| 4) | 775 | 14.8 | 35.01 | 59.6 | 19.6 | 40.5 | 67.8 | 21.9 | 11.85 | 25.8 |
| 5) | 750 | 16.9 | 17.19 | 40.4 | 9.5 | 27.6 | 47.1 | 16.0 | — | — |

The properties of the catalyst are set forth in Table 11 below.

The feedstock of Table 4 was hydroprocessed in a trickle bed reactor under the same conditions as those of Example 1 with the exception that 11.23 g of the above mentioned shot coke was employed as catalyst. The results of the hydroprocessing are set forth in Table 12.

TABLE 11

CATALYST PROPERTIES
(30% Oxidized Shot Coke)

| | |
|---|---|
| Surface Area m²/g | 44 |
| Real Density, g/cc | — |
| Particle Density, g/cc | — |
| Pore Volume, cc/g | — |
| Average Pore diameter, A | approximately 16 |
| Alpha Value | 77.83 |
| C, % | 2.98 |
| H, % | 3.60 |
| N, % | 2.70 |
| S, % | 1.51 |
| Ash, % | 0.94 |
| Fe, % | — |
| $Al_2O_3$, % | — |
| $SiO_2$, % | — |
| Cu (ppm) | — |
| K (ppm) | — |
| Ni (ppm) | 0.098 |
| V (ppm) | 0.15 |

TABLE 12

Hydroprocessing Results for Shot Coke (30% oxidized)

| Sample No. | °F. | t(days) | Conversion | % deM | % deS | % deCCR |
|---|---|---|---|---|---|---|
| 1) | 750 | 2.2 | 12.83 | 0.4 | 5.0 | — |
| 2) | 750 | 6.8 | 13.88 | — | 7.1 | 4.4 |
| 3) | 775 | 8.7 | 21.29 | 7.8 | 9.0 | 4.1 |
| 4) | 775 | 14.7 | 18.01 | 7.3 | 8.3 | 8.4 |
| 5) | 750 | 16.9 | 14.06 | — | 3.5 | 7.0 |

EXAMPLE 5

An alkaline version of Darco ® carbon, Petrodarco A ™ was provided. The catalyst has the properties in Table 13.

The feedstock of Table 4 was hydroprocessed in the trickle bed reactor under the same conditions as those of Example 1 with the exception that 11.28 grams of Petrodarco A ™ (12–20 mesh) activated carbon was used as the catalyst.

The results of the hydroprocessing are set forth below in Table 14.

TABLE 13

CATALYST PROPERTIES
Petrodarco A ™ (Alkaline Version of Darco ® C)

| | |
|---|---|
| Surface Area, m²/g | 539 |
| Real Density, g/cc | 2.108 |
| Particle Density, g/cc | 0.741 |
| Pore Volume, cc/g | 0.875 |
| Average Pore diameter, A | 64 |
| Alpha Value | 6.0 |
| C, % | 77.25 |
| H, % | 0.53 |
| N, % | <0.5 |
| S, % | 1.11 |
| Ash, % | 28.83 |
| Fe, % | 1.80 |
| $Al_2O_3$, % | 4.24 |
| $SiO_2$, % | 8.92 |
| Cu(ppm) | 69 |
| K, % | 0.012 |
| Ni (ppm) | 74 |
| V (ppm) | <12 |
| Na, % | 0.26 |
| Ca, % | 4.39 |
| Li, (ppm) | <49 |
| Mg, % | 0.84 |

TABLE 14

Hydroprocessing Results for Petrodarco A ™ (12–20 mesh)

| Sample No. | °F. | t(days) | Conversion | % deM | % deS | % deNi | % deV | % deCCR |
|---|---|---|---|---|---|---|---|---|
| 1 | 750 | 1.8 | 23.80 | 66.0 | 22.2 | 51.8 | 70.4 | 23.1 |
| 2 | 750 | 6.9 | 23.05 | 58.1 | 24.1 | 36.7 | 64.7 | 23.0 |
| 3 | 775 | 8.7 | 38.52 | 76.6 | 31.9 | 53.2 | 83.8 | 33.5 |
| 4 | 775 | 14.8 | 33.66 | 75.0 | 28.1 | 52.8 | 81.8 | 32.7 |
| 5 | 750 | 16.7 | 23.36 | 53.7 | 17.5 | 30.3 | 60.9 | 19.9 |

EXAMPLE 6

An extruded peat based activated carbon, Norit Rox ™ 0.8, was employed. The catalyst has the properties shown in Table 15.

The feedstock of Table 4 was hydroprocessed in a trickle bed reactor under the same conditions as those of Example 1 with the exception that 11.28 grams of Norit Rox ™ 0.8 12–20 mesh activated carbon (without cobalt or molybdenum) was used as the catalyst. The results of the hydroprocessing are set forth below in Table 16.

Figure 2:
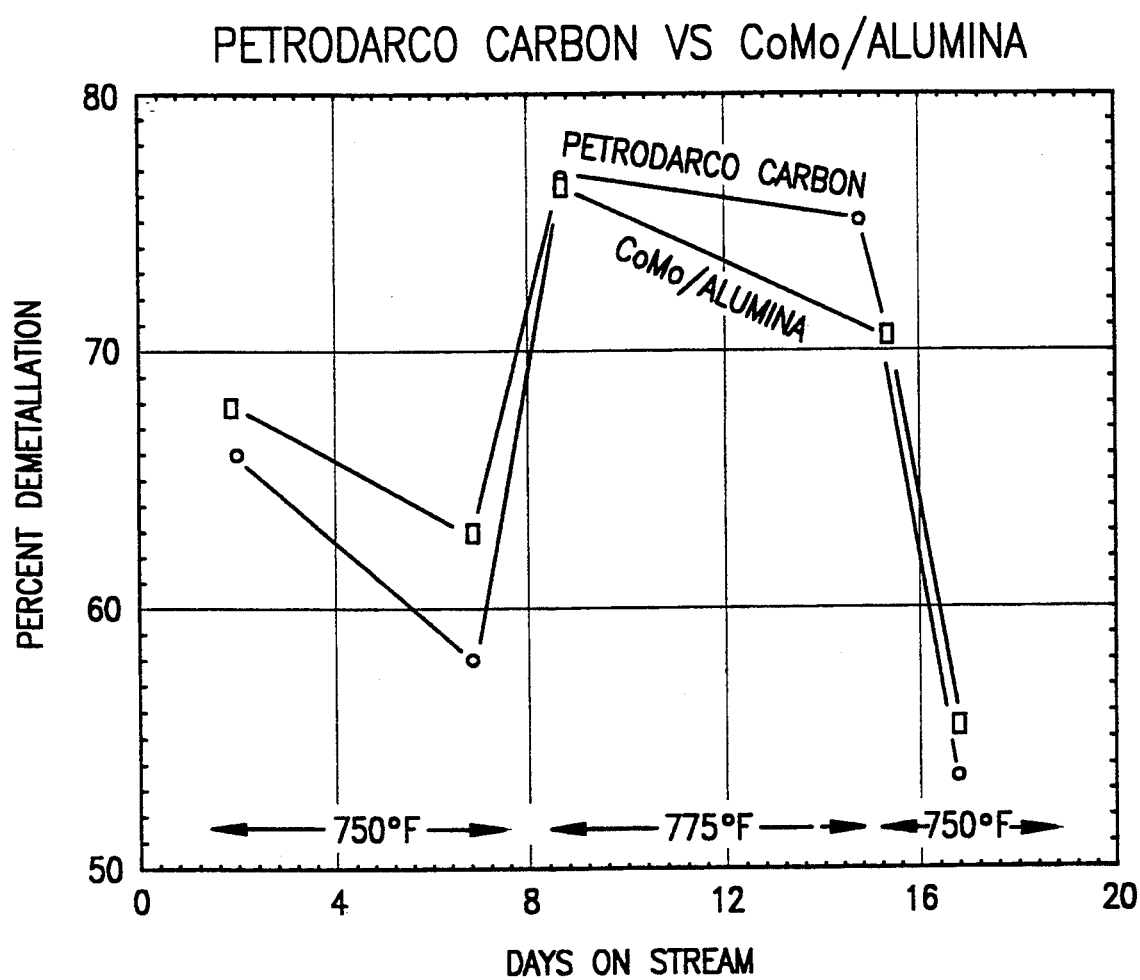
FIG. 2 is a graph illustrating a comparison of the demetallation of heavy oil with Petrodarco A ™ carbon as hydrotreating catalyst in accordance with this invention and CoMo/alumina as hydrotreating catalyst in accordance with known technology.

When activated carbons are compared for demetallation activity for processing the feedstock of Table 4, it is found that Petrodarco A ™ has the highest activity (FIG. 1). The second best is Darco ® carbon followed by Norit Rox ™ 0.8. The lowest activity is found for Alfa ™ carbon (FIG. 1). The demetallation activity of Petrodarco A ™ carbon is comparable to CoMo/alumina (FIG. 2).

Figure 3:
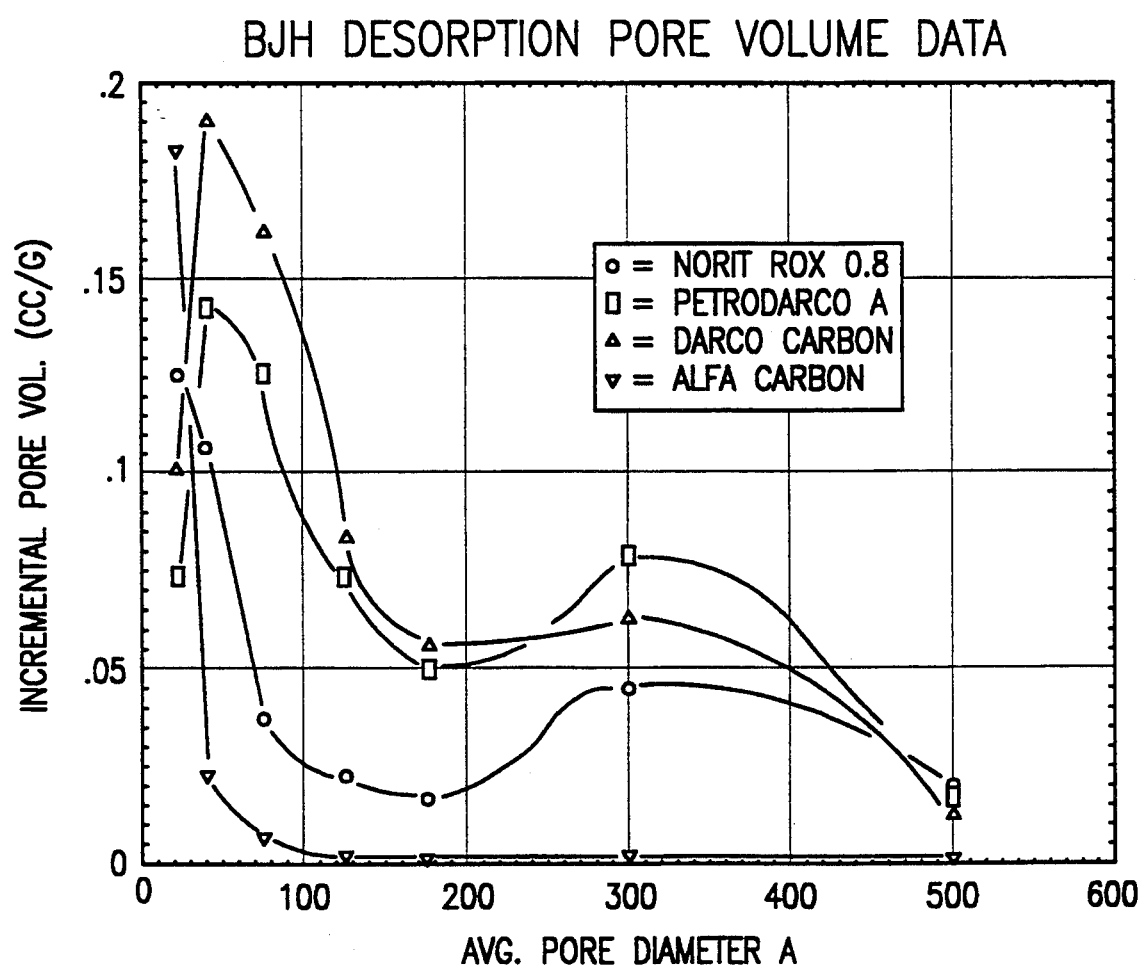
FIG. 3 is a graph illustrating BJH desorption pore volume data for various activated carbon hydrotreating catalysts.
Figure 4:
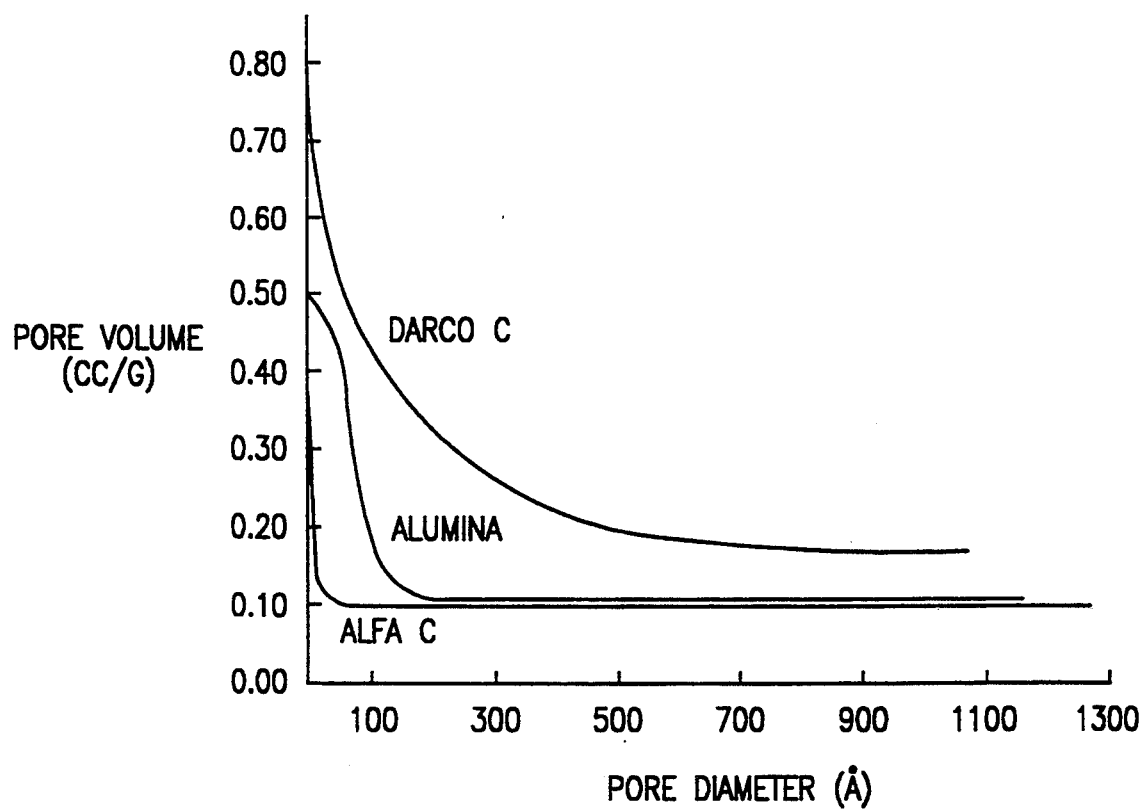
FIG. 4 is a graph comparing the cumulative adsorption pore volume of Darco ® carbon with that of Alfa ™ carbon and alumina.

Comparing the BJH desorption pore volume date (FIG. 3) for the four activated carbons studied here indicates that the more active demetallation catalysts, Darco ® carbon and Petrodarco A ™, have the highest pore volume distributions in the 200–400A range. Large pore volume in the 200–400A range would be able to accommodate resid molecules that range in size from 25 to >200A in diameter. The cumulative adsorption pore volume plot for Darco ® carbon has pore volume in the 100–400A range as has Petrodarco A ™ carbon (FIGS. 4 and 3) while most of the pore volume for the Co/Mo alumina catalyst is found below 100A.

Figure 5:
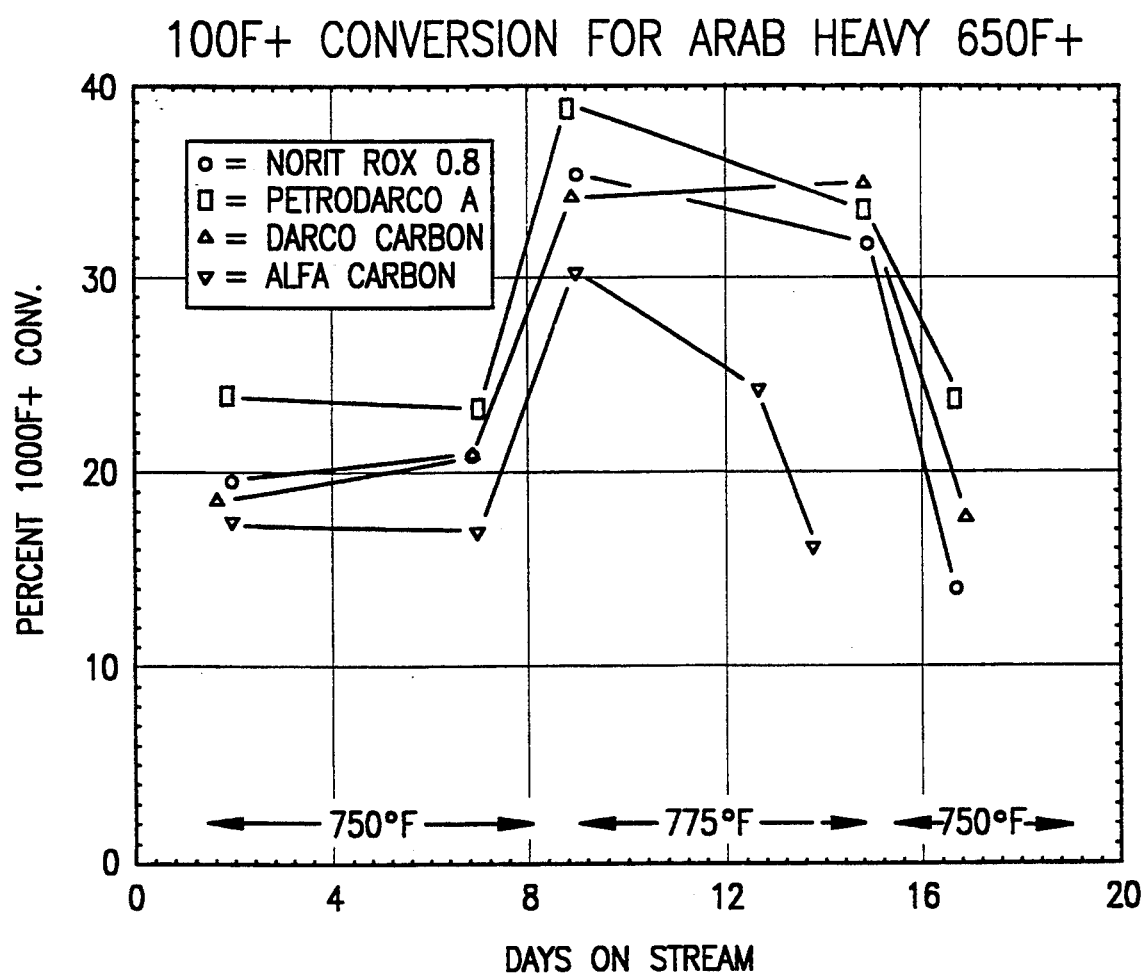
FIG. 5 is a graph illustrating data for the conversion of heavy oil by several selected activated carbon catalysts.

This can account for the high demetallation activity found for Petrodarco A ™ and Darco ® carbons. In fact, the demetallation activity follows the same order as the amount of pore volume found in the 200–400A range (FIGS. 1 and 3) and is: Petrodarco A ™ >Darco ® >Norit Rox ™ 0.8>Alfa ™ Carbon Activity The amount of silica and alumina found in the activated carbon may influence the cracking activity of the carbon. For instance, both Petrodarco A ™ and Darco ® carbons contain >10% $SiO_2+Al_2O_3$ by weight and these two carbon show higher 1000° F.+ conversion over an extended time on stream (FIG. 5).

TABLE 15

CATALYST PROPERTIES
Norit Rox ™ 0.8 (Peat Based Acidic Extruded)

| | |
|---|---|
| Surface Area, $m^2/g$ | 862 |
| Real Density, g/cc | 2.123 |
| Particle Density, g/cc | 0.671 |
| Pore Volume, cc/g | 1.019 |
| Average Pore diameter, A | 47 |
| Alpha Value | 5.5 |
| C, % | 91.80 |
| H, % | 0.54 |
| N, % | 0.55 |
| S, % | 0.78 |
| Ash, % | 1.97 |
| Fe, (ppm) | 202 |
| $Al_2O_3$, (ppm) | 737 |
| $SiO_2$, % | 1.63 |
| Cu (ppm) | <9 |
| K, % | 0.0052 |
| Ni (ppm) | 50 |
| V (ppm) | <9 |
| Na, (ppm) | 197 |
| Ca, % | 0.019 |
| Li, (ppm) | <47 |
| Mg, % | 0.017 |

TABLE 16

Hydroprocessing Results for Norit Rox ™ 0.8 (12–20 mesh)

| Sample No. | °F. | t(days) | Conversion | % deM | % deS | % deNi | % deV | % deCCR |
|---|---|---|---|---|---|---|---|---|
| 1 | 750 | 1.9 | 19.50 | 48.5 | 20.3 | 49.8 | 48.2 | — |
| 2 | 750 | 6.8 | 20.70 | 35.5 | 18.4 | 25.6 | 38.6 | 23.6 |
| 3 | 775 | 8.9 | 35.31 | 51.5 | 30.0 | 36.1 | 56.2 | 29.8 |
| 4 | 775 | 14.9 | 32.05 | 52.0 | 28.8 | 44.7 | 54.2 | 25.3 |
| 5 | 750 | 16.7 | 13.51 | 38.1 | 21.0 | 30.5 | 40.5 | 16.1 |

EXAMPLE 7

A neat Darco ® carbon catalyst was provided. The catalyst had the properties shown in Table 9.

The feedstock was an atmospheric 650° F.+ resid having the properties shown in Table 17.

TABLE 17

650° F.+ Atmospheric Resid

| | |
|---|---|
| Carbon, % | 84.76 |
| Hydrogen, % | 12.29 |
| Nitrogen, % | 0.78 |
| Oxygen, % | 0.64 |
| Sulfur, % | 0.55 |
| CCR | 2.23 |
| Nickel, (ppm) | 3.0 |
| Vanadium, (ppm) | 0.96 |
| B.P. Range, °F. | Fraction |
| 420–650 | 16.9 |
| 650–850 | 39.8 |
| 850–1000 | 19.4 |
| 1000° F.+ | 23.9 |

EXAMPLE 8

The feedstock of Table 17 was hydrotreated in a trickle bed micro unit reactor of standard design starting at 1500 psig $H_2$ partial pressure, 5800 SCF $H_2$/bbl circulation, and 0.5 hr-1 WHSV.

The trickle bed reactor was charged with 11.28 grams of DARCO ® brand activated carbon catalyst (12–20 mesh) and 30 cc of sand. The feed delivery was 5.8 cc/hr. Standard presulfiding of the catalyst was employed with 2% $H_2S$ in hydrogen. All runs took place at 775° F. The run time and pressure protocol was as follows:

(1) 1500 psig for 3 days
(2) 700 psig for 3 days
400 psig for 4 days
100 psig for 4 days The micro unit reactor incorporated a bottoms receiver held at 200° C. to drive off volatiles; a 2° C. liquid cooled trap condensed low boiling component. Gas samples were analyzed with a gas sampling system with bombs. Off gas volumes were measured with a wet test meter.

Figure 6:
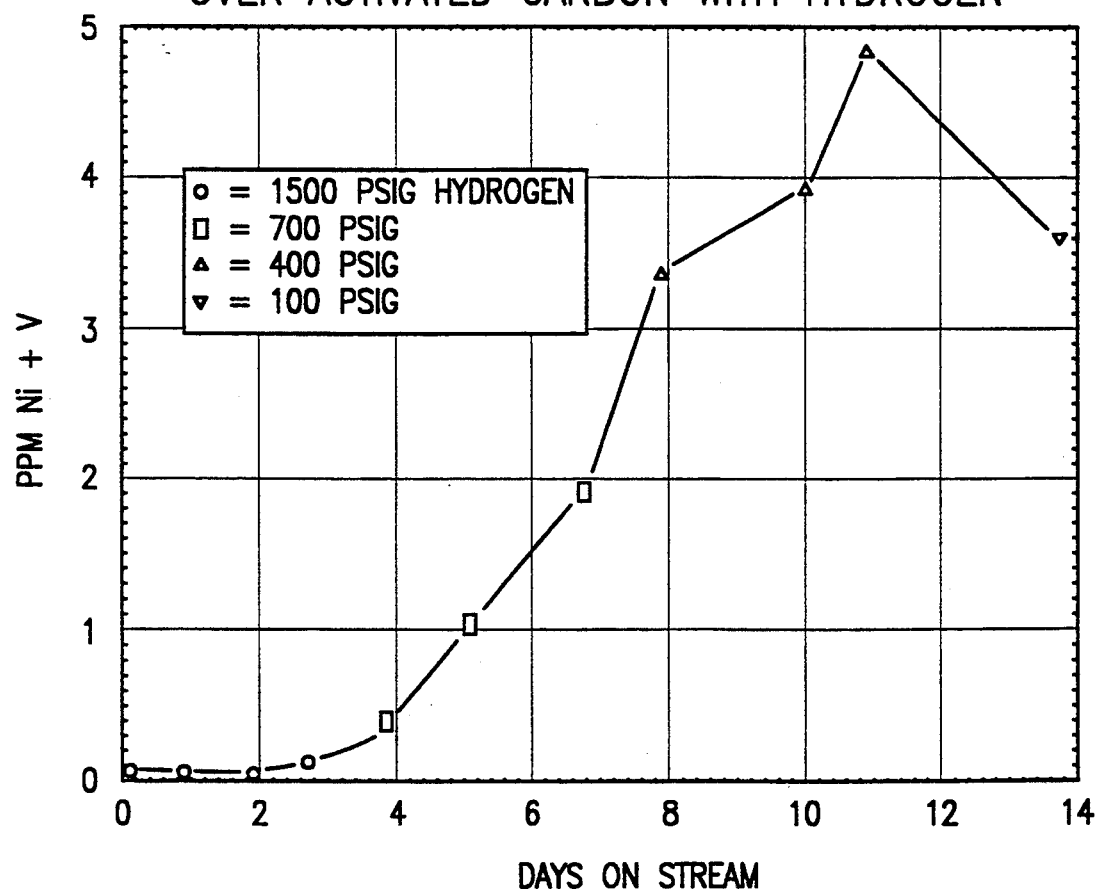
FIG. 6 is a graph illustrating the demetallation of a heavy oil over activated carbon catalyst.

The results of the hydroprocessing are set forth below in Table 18. FIG. 6 shows that 1500 psig hydrogen pressure produces the best demetallation (where about 98% demetallation is obtained). At 700 psig hydrogen, rapid aging occurs and demetallation decreases while below 700 psig hydrogen, not much metal is removed.

This example indicated that pressures >1000 psig are needed for good lifetime of activated carbon catalysts.

TABLE 18

Hydroprocessing 650° F.+ Resid
at 775° F. and Different Pressures

| Sample No. | t(days) | Pressure (psig)* | ppm(Ni + V) | % Demetallation |
|---|---|---|---|---|
| 1 | 0.8 | 1000 | .07 | 98 |
| 2 | 1.1 | 1000 | .07 | 98 |
| 3 | 1.9 | 1000 | .06 | 98 |
| 4 | 2.9 | 1000 | .11 | 97 |
| 5 | 3.8 | 700 | .42 | 90 |
| 6 | 5.1 | 700 | 1.04 | 74 |

TABLE 18-continued

Hydroprocessing 650° F.+ Resid at 775° F. and Different Pressures

| Sample No. | t(days) | Pressure (psig)* | ppm(Ni + V) | % Demetallation |
|---|---|---|---|---|
| 7 | 6.8 | 700 | 1.92 | 48 |
| 8 | 7.9 | 400 | 3.34 | 16 |
| 9 | 10.0 | 400 | 3.90 | 2 |
| 10 | 10.8 | 400 | 4.80 | 0 |
| 11 | 13.8 | 100 | 3.59 | 9 |

*At 2.9 days pressure changed from 1500 to 700 psig and at 6.8 days, 700 to 400 psig at 10.8 days, 400 to 100 psig.

EXAMPLE 9

Using a thermodynamics program, equilibrium calculations were made for coke+water and coke+carbon dioxide reactions. Methane was used in these calculations for a model compound for coke. Table 19 shows than under hydroprocessing conditions of 750° F. and 500 to 1500 psig, water will react with coke. Carbon dioxide also reacts with coke under these conditions. Since hydroprocessing catalysts are designed to last at least a year in a reactor, the use of water, oxygen, air, or carbon dioxide would be sufficiently low that after a year, only about 10–20wt % of the carbon catalyst would be removed by oxidation. No greater than 20% of the carbon catlayst should be oxidized in order to avoid collapse of the catalyst particle.

TABLE 19

Equilibrium Calculations
(shows moles at equilibrium for components in equation)

Coke and Water Reaction
$2 CH_4 + 3 H_2O \rightleftharpoons CO + CO_2 + 3 H_2$
with 100 mol $CH_4$ and 1 mole $H_2O$

| 1000 psig, 700° K. | | | | |
|---|---|---|---|---|
| 99.75 | 0.552 | .039 | .020 | 0.934 |
| 500 psig, 700° K. | | | | |
| 99.69 | 0.458 | .0668 | 0.237 | 1.151 |
| 1500 psig, 700° K. | | | | |
| 99.789 | 0.606 | .02756 | 0.1832 | 0.816 |

Coke and $CO_2$ Reaction
$CH_4 + CO_2 \rightleftharpoons CO + H_2O + H_2$
with 100 moles methane and 1 mole $CO_2$

| 1000 psig, 700° K. | | | | |
|---|---|---|---|---|
| 99.86 | 0.80 | 0.332 | .0584 | 0.216 |
| 500 psig, 700° F. | | | | |
| 99.81 | 0.75 | 0.435 | 0.0607 | 0.314 |

What is claimed is:

1. A process for hydrotreating a hydrocarbon oil feedstock, said process comprising hydrotreating said feedstock at a temperature of from about 500° F. to about 1200° F., a pressure of from about 0 psig to about 4000 psig, and a space velocity of from about 0.1 to about 10 hr$^{-1}$ WHSV in the presence of a carbon-reactive oxidant and a catalyst composition comprising activated carbon possessing a pore volume in the 100 A to 400 A pore diameter range of at least about 0.08 cc/g and an average pore diameter of from about 15 A to about 100 A, wherein said oxidant reacts with the activated carbon to form at least 1% additional carbon surface area during said hydrotreating.

2. The process of claim 1 wherein said oxidant is selected from the group consisting of $H_2O$, $CO_2$, and $O_2$.

3. The process of claim 2 wherein said oxidant comprises steam.

4. The process of claim 3 wherein a steam-carbon reaction promoter is added.

5. The process of claim 4 wherein said steam-carbon reaction promoter is selected from the group consisting of KOH and K—Ca—$O_x$.

6. The process of claim 4 wherein said steam-carbon reaction promoter is selected from the group consisting of Fe, Ca, Ni, V, Ba, Mg, Mn, Zn, and P compounds.

7. The process of claim 1 wherein said catalyst composition further comprises a) a molybdenum or tungsten component, and b) a cobalt or nickel component, and said activated carbon possesses a pore volume in the 100 A to 400 A pore diameter range of at least about 0.2 cc/g.

8. The process of claim 1 wherein said activated carbon possesses an average pore diameter of from about 40 A to about 90 A.

9. The process of claim 1 wherein said activated carbon possesses a pore area in the 100 A to 400 A pore diameter range of at least about 18 square meters per gram.

10. The process of claim 1 wherein said activated carbon possesses a pore area in the 100 A to 400 A pore diameter range of at least about 50 square meters per gram.

11. The process of claim 1 wherein said activated carbon possesses an Alpha value of from about 3 to about 6.

12. The process of claim 1 in which the hydrocarbon oil feedstock is characterized by a distillation boiling point range such that the fraction boiling at over 650° F. comprises at least 70% of the hydrocarbon oil.

13. The process of claim 1 wherein said process is carried out in a fixed bed type reactor.

14. The process of claim 1 wherein said hydrotreating conditions include a temperature of from about 500° F. to about 1200° F., a pressure of from about 0 psig to about 4000 psig, a space velocity of from about 0.1 to about 10 hr-1 WHSV, and a steam partial pressure of at least 50 psig.

15. The process of claim 1 wherein said hydrotreating conditions include a temperature of from about 600° F. to about 1000° F., a pressure of from about 500 psig to about 2500 psig, a space velocity of from about 0.2 to about 5 hr-1 WHSV, and a steam partial pressure ranging from about 100 psig to about 1000 psig.

16. The process of claim 1 wherein said hydrotreating conditions include a temperature of from about 700° to about 900° F., a pressure of from about 1000 psig to about 2000 psig, a space velocity of from about 0.3 to about 1.0 hr-1 WHSV, and a steam partial pressure of from about 100 psig to about 500 psig.

17. The process of claim 1 wherein said hydrotreating conditions include a temperature of from about 500° F. to about 1200° F., a pressure of from about 0 psig to about 4000 psig, a space velocity of from about 0.1 to about 10 hr-1 WHSV, and an $O_2$ partial pressure of at least 50 psig where hydrogen is flushed from the reactor before $O_2$ is added.

18. The process of claim 1 wherein said hydrotreating conditions include a temperature of from about 500° F. to about 1200° F., a pressure of from about 0 psig to about 4000 psig, a space velocity of from about 0.1 to about 10 hr-1 WHSV, and a $CO_2$ partial pressure of at least 50 psig.

19. The process of claim 1 wherein said hydrotreating includes demetallation, desulfurization, reduction of pentane insoluble asphaltenes, and the reduction of carbon residue of the feedstock.

20. The process of claim 19 wherein said demetallation is characterized by at least a 50% reduction in the combined content of nickel and vanadium compounds present in the feedstock.

21. The process of claim 1 wherein the hydrotreating conditions include a hydrogen circulation rate of from about 300 SCF $H_2$/bbl to about 6000 SCF $H_2$/bbl of feedstock.

* * * * *